(12) United States Patent
Cambois

(10) Patent No.: US 8,811,115 B2
(45) Date of Patent: Aug. 19, 2014

(54) ATTENUATING SEISMIC INTERFERENCE NOISE USING A DUAL SENSOR RECORDING SYSTEM

(75) Inventor: Guillaume Cambois, Oslo (NO)

(73) Assignee: PGS Geophysical AS, Oslo (NO)

(*) Notice: Subject to any disclaimer, the term of this patent is extended or adjusted under 35 U.S.C. 154(b) by 584 days.

(21) Appl. No.: 12/228,626

(22) Filed: Aug. 14, 2008

(65) Prior Publication Data

US 2010/0039891 A1 Feb. 18, 2010

(51) Int. Cl.
*G01V 1/38* (2006.01)
*G01V 1/36* (2006.01)

(52) U.S. Cl.
CPC .............. *G01V 1/36* (2013.01); *G01V 2210/56* (2013.01); *G01V 1/38* (2013.01); *G01V 2210/32* (2013.01)
USPC ............................................. 367/38; 367/15

(58) Field of Classification Search
CPC ........... G01S 2015/02; G01V 2210/32; G01V 2210/59; G01V 1/30; G01V 1/36; G01V 1/38
USPC .................................... 367/15, 21–24, 37, 38
See application file for complete search history.

(56) References Cited

U.S. PATENT DOCUMENTS

| 3,979,713 | A | | 9/1976 | Parrack | |
|---|---|---|---|---|---|
| 5,455,806 | A | * | 10/1995 | Hutson | 367/100 |
| 5,761,152 | A | | 6/1998 | Jacobsen et al. | |
| 5,774,417 | A | * | 6/1998 | Corrigan et al. | 367/24 |
| 5,818,795 | A | | 10/1998 | Hawkins et al. | |
| 5,835,451 | A | | 11/1998 | Soubaras | |
| 6,704,244 | B1 | | 3/2004 | Vaage | |
| 6,751,559 | B2 | | 6/2004 | Fookes et al. | |
| 7,239,577 | B2 | | 7/2007 | Tenghamn et al. | |
| 7,359,283 | B2 | * | 4/2008 | Vaage et al. | 367/24 |
| 2005/0265122 | A1 | | 12/2005 | Grion | |
| 2007/0140056 | A1 | | 6/2007 | Gratacos | |
| 2009/0006516 | A1 | * | 1/2009 | Ha | 708/404 |

OTHER PUBLICATIONS

Ball et al. "Dual-sensor summation of noisy ocean-bottom data", 66th Annual International Meeting: SEG, 28-31, 2002.*
Robert Soubaras, "Ocean bottom hydrophone and geophone processing", 1996, SEG Expanded Abstract, pp. 24-27, vol. 15.
Fred J. Barr, Joe I. Sanders, (1989), "Attenuation of Water-Column Reverberations Using Pressure and Velocity Detectors in a Waver-Bottom Cable", Annual Meeting SEG Expanded Abstracts, pp. 653-656.
Rune Tenghamn, Svein Vaage, Claes Børresen, (2007), "a Dual-Sensor, Towed Marine Streamer; Its Viable Implementation and Initial Results", SEG/San Antonio Annual 2007 Meeting, Expanded Abstracts, pp. 989-993.
K. Schneiderbauer, International Search Report, Nov. 24, 2009.

* cited by examiner

*Primary Examiner* — Krystine Breier

(57) ABSTRACT

A method for attenuating noise in marine seismic signals includes cross ghosting pressure responsive marine seismic signals and contemporaneously acquired motion responsive marine seismic signals. A difference is determined between the cross ghosted signals. The difference is used to attenuate noise in at least one of the pressure responsive signals and the motion responsive signals.

16 Claims, 2 Drawing Sheets

ATTENUATING SEISMIC INTERFERENCE NOISE USING A DUAL SENSOR RECORDING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic data acquisition and processing. More particularly, the invention relates to methods for processing marine seismic signals to attenuate the effects of certain types of noise.

2. Background Art

Seismic surveying is known in the art for determining structures of rock formations below the earth's surface. Seismic surveying generally includes deploying an array of seismic sensors at the surface of the earth in a selected pattern, and selectively actuating a seismic energy source positioned near the seismic sensors. The energy source may be an explosive, a vibrator, or in the case of seismic surveying performed in a body of water such as the ocean, one or more air guns or water guns.

Seismic energy which emanates from the source travels through the earth formations until it reaches an acoustic impedance boundary in the formations acoustic impedance boundaries typically occur where the composition and/or mechanical properties of the earth formation change. Such boundaries are typically referred to as "bed boundaries." At a bed boundary, some of the seismic energy is reflected back toward the earth's surface. The reflected energy may be detected by one or more of the seismic sensors deployed on the surface. Seismic signal processing known in the art has as one of a number of objectives the determination of the depths and geographic locations of bed boundaries below the earth's surface. The depth and location of the bed boundaries is inferred from the travel time of the seismic energy to the bed boundaries and back to the sensors at the surface.

Seismic surveying is performed in the ocean and other bodies of water ("marine seismic surveying") to determine the structure and composition of rock formations below the sea bed. Marine seismic surveying systems known in the art include a vessel which tows one or more seismic energy sources, and the same or a different vessel which tows one or more "streamers." Streamers are arrays of seismic sensors in a cable that is towed by the vessel. Typically, a seismic vessel will tow a plurality of such streamers arranged to be separated by a selected lateral distance from each other, in a pattern selected to enable relatively complete determination of geologic structures in three dimensions. It is also known in the art to place cables having seismic sensors ("ocean bottom cables") along the sea bed, and actuate a seismic energy source in the water. Typically, the seismic energy source will be towed by a vessel just as in streamer-type surveying.

In addition to reflected seismic energy both coherent noise and incoherent noise may be present in the detected seismic energy. The presence of noise in the energy detected by the seismic sensors reduces the signal to noise ratio ("SNR") of the seismic signals of interest. One objective of seismic data processing is, therefore, reduce the effects of noise on the signals detected by the seismic sensors without appreciably reducing the true seismic signal component of the detected signals.

Prior art methods which have been used to reduce the effects of noise and acquire a higher quality representation of a particular subsurface structure include using multiple actuations of the seismic source (multiple "firings" or "shots") to record a plurality of sensor measurements from substantially the same subsurface structure, and then summing or "stacking" such measurements to enhance signal strength while substantially reducing the effects of random or incoherent noise.

U.S. Pat. No. 5,818,795 which is assigned to an affiliate of the assignee of the present invention, and which provides a detailed summary of prior art methods and systems addressing the problem of noise suppression in seismic signals, discloses a method of reducing the effect of "burst" noise in seismic signal recordings without eliminating seismic signals of interest.

U.S. Pat. No. 5,761,152, which is assigned to an affiliate of the assignee of the present invention, describes a method and system for marine seismic surveying. The method disclosed in the '152 patent includes increasing the fold (number of recorded reflections from a same reflector), and as a result the signal-to-noise ratio of coherent seismic signals, without incurring the problems of drag, entanglement, complicated deck handling associated with increased streamer length, increased number of streamers, and increased distance between streamers. Source and streamer "offsets", and time of firing of lead and trailing vessel sources in a time delay sequence are optimized to increase the fold while avoiding substantial influence by the seismic signals resulting from the source of one vessel on the seismic signals resulting from the source of the other vessel.

The foregoing description is not meant to be an exhaustive explanation of the types of noise and the methods for reducing the effects thereof in seismic signals. There are two types of noise, however, for which prior art methods have not reduced the effects to an acceptable degree. One of these types of noise is generated by vessels or rigs in the vicinity of the seismic vessel (here termed "continuous ship noise"). The other type of noise is impulsive noise which originates as a result of actuation of the seismic energy source, wherein the seismic energy travels laterally through the water both directly to the sensors, and to reflectors in the water and then back to the sensors on the array (the latter being termed "back scattered noise"). Such impulsive noise may also originate from the seismic energy sources used by a different seismic acquisition system located and operated some distance from the acquisition system in question. It is desirable to have a method for attenuating impulsive noise and continuous ship noise in marine seismic data. In the case of noise generated by another seismic system, one technique known in the art is "time sharing" wherein data acquisition by one system is delayed during data acquisition by the other system. Such time sharing reduces operating efficiency of on both systems.

U.S. Pat. No. 6,751,559 issued to Fookes et al. and assigned to an affiliate of the present invention describes a method for attenuating noise from marine seismic signals caused by a noise in the water. The disclosed method includes determining an arrival time of a noise event at each of a plurality of seismic sensors, estimating a position of the noise source from the arrival times, and attenuating the noise event from the signals detected by the seismic sensors.

There continues to be a need for improved techniques for attenuation of noise in seismic data.

SUMMARY OF THE INVENTION

A method for attenuating noise in marine seismic signals according to one aspect of the invention includes cross ghosting pressure responsive marine seismic signals and contemporaneously acquired motion responsive marine seismic signals. A difference is determined between the cross ghosted signals. The difference is used to attenuate noise in at least one of the pressure responsive signals and the motion responsive signals.

A method for seismic surveying according to another aspect of the invention includes towing a seismic energy source and a plurality of pressure responsive seismic sensors and motion responsive seismic sensors in a body of water and actuating the seismic energy source at selected times. Signals detected by the pressure responsive sensors and the motion responsive sensors are recorded. The pressure responsive signals and the motion responsive signals are cross ghosted. A difference between the cross ghosted signals is determined. The difference is used to attenuate noise in a least one of the pressure responsive signals and the motion responsive signals.

Other aspects and advantages of the invention will be apparent from the following description and the appended claims.

DETAILED DESCRIPTION

Figure 1:
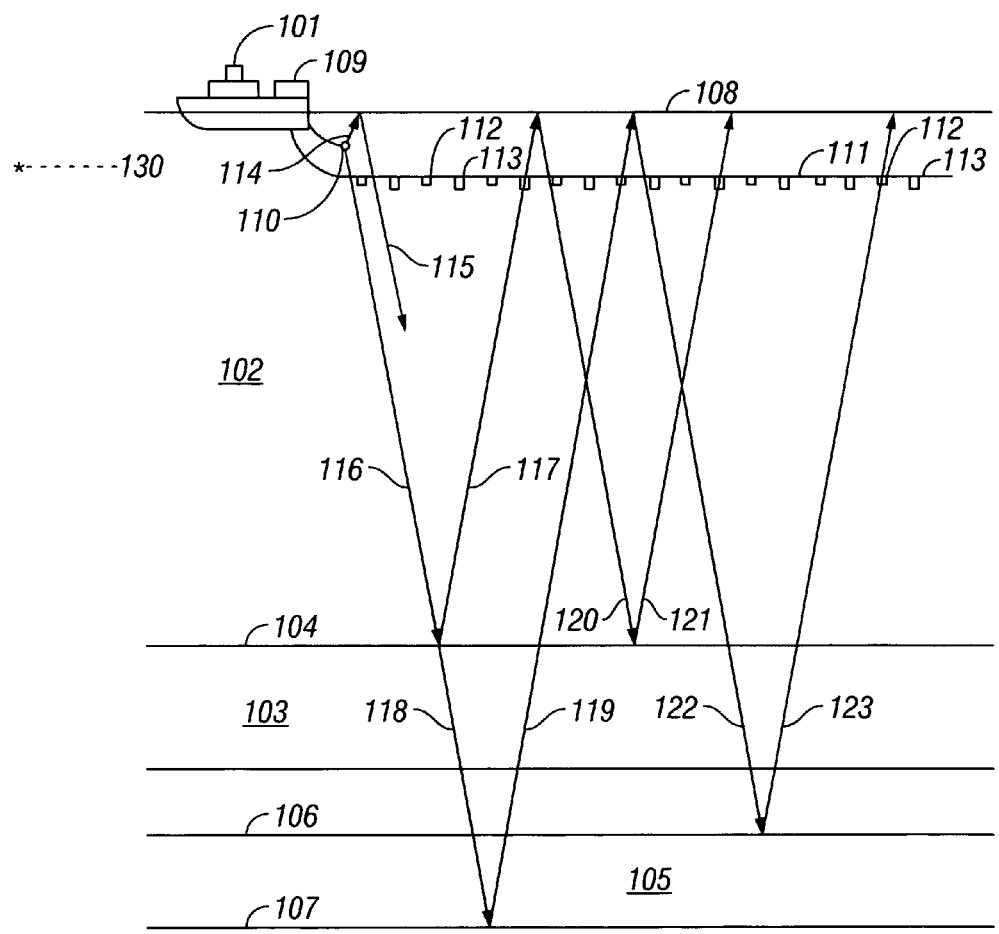
FIG. 1 shows an example of acquiring seismic data for use with a method according to the invention.

FIG. 1 shows an example of acquiring marine seismic data that can be used with the method of the invention. A seismic vessel 101 moves along the surface 108 of a body of water 102 above a portion 103 of the subsurface that is to be surveyed. Beneath the water bottom 104, the portion 103 of the subsurface contains rock formations of interest such as a layer 105 positioned between an upper boundary 106 and lower boundary 107 thereof. The seismic vessel 101 contains seismic acquisition control equipment, designated generally at 109. The seismic acquisition control equipment 109 includes navigation control, seismic energy source control, seismic sensor control, and signal recording equipment, all of which can be of types well known in the art.

The seismic acquisition control equipment 109 causes a seismic source 110 towed in the body of water 102 by the seismic vessel 101 (or by a different vessel) to actuate at selected times. The seismic source 110 may be of any type well known in the art of seismic acquisition, including air guns or water guns, or particularly, arrays of air guns. Seismic streamers 111 are also towed in the body of water 102 by the seismic vessel 101 (or by a different vessel) to detect the acoustic wavefields initiated by the seismic source 110 and reflected from interfaces in the environment. Although only one seismic streamer 111 is shown in FIG. 1 for illustrative purposes, typically a plurality of laterally spaced apart seismic streamers 111 are towed behind the seismic vessel 101. The seismic streamers 111 contain sensors to detect the reflected wavefields initiated by the seismic source 110. In the present example the seismic streamers 111 contain pressure responsive sensors such as hydrophones 112, and water particle motion responsive sensors such as geophones 113. The hydrophones 112 and geophones 113 are typically co-located in pairs or pairs of sensor arrays at regular intervals along the seismic streamers 111. However, the type of sensors 112, 113 and their particular locations along the seismic streamers 111 are not intended to be limitations on the present invention.

Each time the seismic source 110 is actuated, an acoustic wavefield travels in spherically expanding wave fronts. The propagation of the wave fronts will be illustrated herein by ray paths which are perpendicular to the wave fronts. An upwardly traveling wavefield, designated by ray path 114, will reflect off the water-air interface at the water surface 108 and then travel downwardly, as in ray path 115, where the wavefield may be detected by the hydrophones 112 and geophones 113 in the seismic streamers 111. Such a reflection from the water surface 108, as in ray path 115 contains no useful information about the subsurface formations of interest. However, such surface reflections, also known as ghosts, act as secondary seismic sources with a time delay from initiation of the seismic source 110.

The downwardly traveling wavefield, in ray path 116, will reflect off the earth-water interface at the water bottom 104 and then travel upwardly, as in ray path 117, where the wavefield may be detected by the hydrophones 112 and geophones 113. Such a reflection at the water bottom 104, as in ray path 117, contains information about the water bottom 104. Ray path 117 is an example of a "primary" reflection, that is, a reflection originating from a boundary in the subsurface. The downwardly traveling wavefield, as in ray path 116, may transmit through the water bottom 104 as in ray path 118, reflect off a layer boundary, such as 107, of a layer, such as 105, and then travel upwardly, as in ray path 119. The upwardly traveling wavefield, ray path 119, may then be detected by the hydrophones 112 and geophones 113. Such a reflection off a layer boundary 107 contains useful information about a formation of interest 105 and is also an example of a primary reflection.

The acoustic wavefields will continue to reflect off interfaces such as the water bottom 104, water surface 108, and layer boundaries 106, 107 in combinations. For example, the upwardly traveling wavefield in ray path 117 will reflect off the water surface 108, continue traveling downwardly in ray path 120, may reflect off the water bottom 104, and continue traveling upwardly again in ray path 121, where the wavefield may be detected by the hydrophones 112 and geophones 113. Ray path 121 is an example of a multiple reflection, also called simply a "multiple", having multiple reflections from interfaces. Similarly, the upwardly traveling wavefield in ray path 119 will reflect off the water surface 108, continue traveling downwardly in ray path 122, may reflect off a layer boundary 106 and continue traveling upwardly again in ray path 123, where the wavefield may be detected by the hydrophones 112 and geophones 113. Ray path 123 is another example of a multiple reflection, also having multiple reflections in the subterranean earth.

Some of the seismic energy will travel essentially parallel to the water surface from the source 110 to the hydrophones 112 and geophones 113. In addition to the foregoing seismic energy, the hydrophones and geophones may detect noise originating from places remote from the acquisition system, such as, for example, other seismic acquisition systems and drilling platforms in the water. Methods according to the invention are intended to attenuate such noise and the foregoing "direct" seismic energy. In FIG. 1, a noise source is shown generally at 130 and is intended to represent any type of noise source that causes acoustic energy to move horizontally through the water.

For purposes of the following explanation, the terms "hydrophone" and "geophone" will be used as shorthand descriptions for the types of signals being processed. It is to be clearly understood that the term "hydrophone" in the following description is intended to mean a signal detected by any form of pressure responsive or pressure time gradient responsive sensor. Correspondingly, "geophone" signals are interned to mean a signal detected by any form of particle motion responsive sensor, including accelerometers, velocity meters and the like.

A method according to the invention begins using the recorded hydrophone and geophone signals corresponding to each actuation of the source. The recordings should be compensated for their respective sensor and recording channels' impulse responses and the transduction constant of each type of sensor used. Each such record of hydrophone and geophone recordings corresponding to a particular actuation of the source may be referred to as a "common shot" record or common shot "gather." The signal recordings may be indexed with respect to time of actuation of the seismic source, and may be identified by the geodetic position of each seismic sensor at the time of recording. The geophone signals may be normalized with respect to the angle of incidence of the seismic wavefront detected by each geophone. See, for example, U.S. Pat. No. 7,359,283 issued to Vaage et al. and assigned to an affiliate of the assignee of the present invention for a description of such normalization. The hydrophone response is substantially omni-directional and does not require correction or normalization for angle of incidence.

In a practical implementation of a method, the normalized common-shot records may then be transformed from the time-position domain into the frequency-wavenumber (f-k) domain. The resulting domain-transformed signals can be expressed as:

$$H = P_{up}(1-Z) + N_{SI} + P_{DA}$$

$$G = P_{up}(1+Z) \quad (1)$$

where H represents the f-k transform of the hydrophone signals and G represents the f-k transform of the normalized geophone signals. $P_{up}$ represents the upwardly propagating pressure wave field, Z represents the frequency-domain time delay operator or $\exp(-i\omega\tau)$ in which i is the imaginary number $\sqrt{-1}$, $\omega$ represents the angular frequency, and $\tau$ represents the "ghost" reflection travel time from the seismic sensors to the water surface and back. $N_{SI}$ represents noise arriving horizontally at the seismic sensors. Such noise may be generated, for example by other seismic vessels operating in the area a relatively large distance from the acquisition system. $P_{DA}$ represents that portion of the seismic pressure wavefield traveling horizontally from the seismic source to the seismic sensors. The quantities (1+Z) and (1-Z) represent the geophone and hydrophone "ghosting" functions, respectively. The time delay and the respective ghosting functions can be determined if the depth of each seismic sensor in the water is known or determinable, as the velocity of seismic energy in the water is known or determinable. The present example includes transformation of the hydrophone and geophone signals into the frequency-wavenumber domain in particular to facilitate calculating the geophone and hydrophone ghosting functions. It is to be understood that other implementations may process the signals other than in the frequency-wavenumber domain.

In a method according to the invention, the foregoing horizontally traveling noise and horizontally traveling seismic energy are to be attenuated from the hydrophone signals. It may be assumed that $N_{SI}$ and $P_{DA}$ arrive essentially horizontally at the hydrophones and geophones. If vertically oriented geophones are used in the streamers, such horizontally traveling signal components may be assumed to be substantially absent from the geophone signals. An example of a streamer including hydrophones and vertically oriented geophones is described in U.S. Pat. No. 7,239,577 issued to Tenghamn et al. and assigned to an affiliate of the assignee of the present invention.

Applying the geophone ghosting function (1+Z) to the hydrophone signals and applying the hydrophone ghosting function (1-Z) to the geophone signals results in the following expressions:

$$(1+Z)H = P_{up}(1-Z)(1+Z) + (1+Z)[N_{SI} + P_{DA}]$$

$$(1-Z)G = P_{up}(1+Z)(1-Z) \quad (2)$$

The signals resulting from application of the foregoing ghosting functions as above may be referred to as "cross ghosted" signals. The difference between the foregoing cross-ghosted signals may be represented by the expression:

$$(1+Z)H - (1-Z)G = (1+Z)[N_{SI} + P_{DA}] \quad (3)$$

The foregoing difference ("difference signal") is equal to the seismic interference noise $N_{SI}$ and direct arrival signals $P_{DA}$ convolved with the geophone ghosting function (1+Z). The foregoing contains essentially no seismic signal information, but contains the two foregoing types of noise. The foregoing difference function may be used to attenuate noise in the hydrophone signal or the geophone signal.

One example of such attenuation with respect to the hydrophone signal is to simply zero the hydrophone signal (replace the recorded amplitude value with zero) at every time sample where the amplitude of the corresponding time sample of the difference signal is greater than that of the difference signal background noise level. The samples representing either of these two forms of noise typically constitute only a small number of the total samples on any recorded data trace, and therefore on a trace of the difference signal. In one example it is possible to compute the average absolute value of the samples in the difference-signal trace, represented by A, then zero any corresponding time samples in the hydrophone signal for difference signal samples whose absolute value is greater than a selected multiple of A, for example, 1.2 A (20% greater than A). The foregoing operation would cause variable length "windows" of zero-value samples on the processed hydrophone signals. To smooth the hydrophone signals in such cases it is desirable to apply linear ramp functions to the signal samples before and after each such window. The length of such linear ramps might be on the order of 100 milliseconds.

As will be appreciated by those skilled in the art, the geophone signals include substantial noise resulting from towing the streamers in the water. In a practical implementation of a method according to the invention, tow noise may be attenuated by synthesizing the low-frequency part of the geophones' signal spectra, for example, as described in U.S. Pat. No. 7,359,283 issued to Vaage et al. and assigned to an affiliate of the assignee of the present invention.

To use such a technique to attenuate the effects of towing noise in the geophone signals, begin with the recorded common-shot domain hydrophone and geophone signals, properly compensated for their respective sensor and recording channels' impulse responses and their transduction constants as explained above. The geophone signals should be corrected for their directional sensitivity as explained above. The common-shot records may then be transformed into the frequency-wavenumber (f-k) domain. The resulting (f-k) domain transformed signals can be expressed as:

$$H = P_{up}(1-Z) + N_{SI} + P_{DA} \quad (4)$$
$$G = P_{up}(1+Z) + \int_{f=0}^{flow} N_{TOW}$$

in which corresponding variables represent the same parameters as described above in equations (1) through (3), and $N_{TOW}$ represents the towing induced noise in the geophone signals, essentially confined to frequencies between 0 and flow, where flow is typically about 20 Hz.

As described in the Vaage et al. patent referred to above, the tow noise in the geophone signals may be removed from the geophone signals G by estimating G's spectrum for frequencies between 0 and flow. Such estimation may be performed using the spectrum of the hydrophone signals H. The resulting f-k transform of the geophone signals having synthesized low frequency components, $G_{LFC}$, may be represented by the expression:

$$G_{LFC} = \int_{f=0}^{flow} H\frac{(1+Z)}{(1-Z)} + \int_{f=flow}^{fnyq} P_{up}(1+Z) \quad (5)$$

$$G_{LFC} = \int_{f=0}^{flow} [P_{up}(1-Z) + N_{SI} + P_{DA}]\frac{(1+Z)}{(1-Z)} + \int_{f=flow}^{fnyq} P_{up}(1+Z)$$

where $f_{nyq}$ represents the Nyquist frequency, that is, the highest frequency contained in the geophone and hydrophone signals. In the second expression above for $G_{LFC}$, the expression for H has been substituted from the above expression Applying the geophone ghosting operator to H and the hydrophone ghosting operator to $G_{LFC}$ (cross ghosting) results in the expressions:

$$(1+Z)H = P_{up}(1-Z)(1+Z) + (1+Z)[N_{SI} + P_{DA}] \quad (6)$$

$$(1-Z)G_{LFC} = \int_{f=0}^{flow} [P_{up}(1-Z) + N_{SI} + P_{DA}](1+Z) + \int_{f=flow}^{fnyq} P_{up}(1+Z)(1-Z)$$

$$(1-Z)G_{LFC} = P_{up}(1+Z)(1-Z) + \int_{f=0}^{flow} [N_{SI} + P_{DA}](1+Z)$$

Subtracting the cross-ghosted signals from each other provides the expressions:

$$(1+Z)H - (1-Z)G_{LGC} = \quad (7)$$
$$(1+Z)[N_{SI} + P_{PA}] - \int_{f=0}^{flow} (1+Z)[N_{SI} + P_{DA}]$$

$$(1+Z)H - (1-Z)G_{LGC} = \int_{f=flow}^{fnyq} (1+Z)[N_{SI} + P_{DA}]$$

Because the low-frequency portion of the geophone spectrum was computed from the hydrophone spectrum to eliminate the tow noise, the low-frequency portion of the geophone-ghosted seismic interference noise and direct arrivals are essentially absent from the above determined difference signal. However, the foregoing difference signal can still be used to filter noise from the hydrophone and/or geophone signals, for example by zeroing the hydrophone traces at every time sample therein corresponding to a time sample in the difference signal having a magnitude greater than its background noise level. The background noise level may be calculated as explained above.

Although the foregoing example includes transformation of the signals into the frequency-wavenumber domain, such transformation is only for convenience. It will be appreciated by those skilled in the art that the foregoing process can be performed without the need to transform the signals into the frequency-wavenumber domain.

Figure 2:
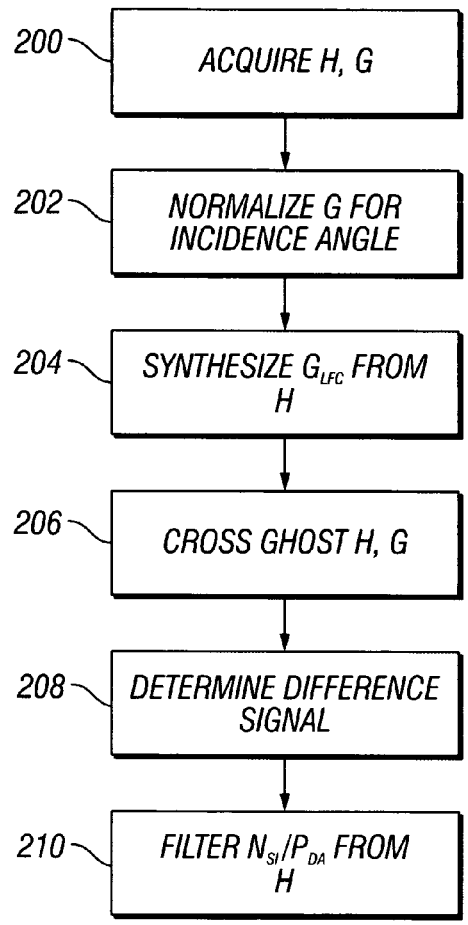
FIG. 2 shows a flow chart of an example method according to the invention.

An example of a method according to the invention is shown in a flow chart in FIG. 2. The hydrophone and geophone signals are shown as being acquired at 200. The geophone signals may be normalized for angle of incidence at 202. At 204, the hydrophone signals may be used to synthesize the low frequency component of the geophone signals. The hydrophone and geophone signals may be transformed into the frequency-wavenumber domain. At 206, the transformed signals are cross-ghosted. At 208, a difference between the cross ghosted signals is determined. At 210, the difference signal is used to attenuate noise in the hydrophone signal. In some examples, to be used to attenuate noise in the hydrophone signal, the difference signal may be inverse transformed to the time position domain.

Figure 3:
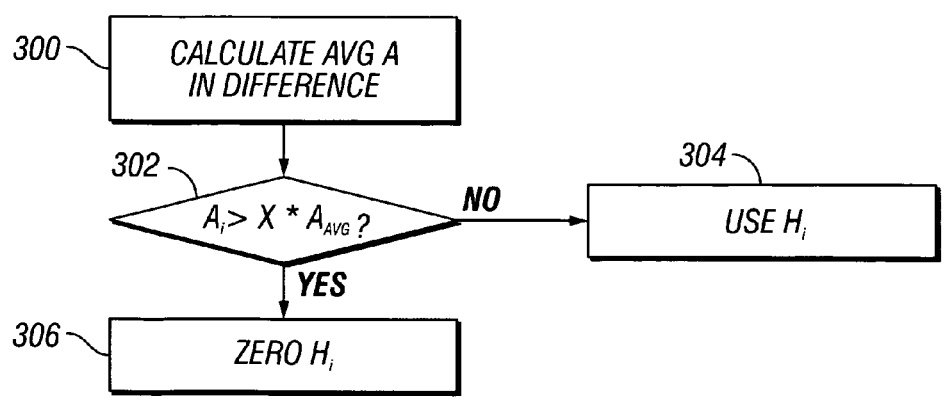
FIG. 3 shows a flow chart of an example method for using a difference signal to remove noise from a hydrophone signal.

FIG. 3 shows a flow chart of an example of using the difference signal to attenuate noise in the hydrophone signal. At 300, an average A of the absolute value of the difference signal is determined. At 302, each sample $A_i$ of the difference signal is compared to a selected multiple X of the average A. If the sample value exceeds the selected multiple of A, then the time corresponding sample in the hydrophone signal may be set to zero ("zeroed"). The foregoing may be repeated for each hydrophone signal.

Methods according to the invention may provide improved attenuation of water borne noise in seismic signals. Methods according to the invention may enable seismic survey operations using multiple acquisition systems without the need to "time share" operation of seismic sources in such multiple systems, saving time and cost.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for attenuating noise in marine seismic signals, comprising:
    cross ghosting pressure responsive marine seismic signals acquired by deploying pressure responsive sensors in a body of water, and contemporaneously acquired motion responsive marine seismic signals acquired by deploying particle motion responsive sensors in a body of water, the signals acquired in response to actuation of a seismic energy source in the body of water;
    determining a difference between the cross ghosted signals; and
    using the difference to attenuate substantially horizontally propagating noise in at least one of the pressure responsive signals and the motion responsive signals.

2. The method of claim 1 wherein the cross ghosting comprises transforming the pressure responsive signals and the motion responsive signals into the frequency-wavenumber domain and applying a ghosting operator from the pressure responsive signals to the motion responsive signals and vice versa.

3. The method of claim 2 wherein the respective ghosting operators are related to a travel time of seismic energy between a depth of seismic sensors in a body of water and the surface of the body of water.

4. The method of claim 1 wherein the noise comprises at least one of noise from a vessel and noise from a seismic energy source.

5. The method of claim 4 wherein the seismic energy source noise originates from a same source used to acquire the pressure responsive and motion responsive seismic signals.

6. The method of claim 4 wherein the motion responsive signals are normalized for an angle of incidence of seismic energy.

7. The method of claim 1 wherein noise induced in the motion responsive signals by towing seismic equipment in a body of water is attenuated by synthesizing a selected frequency range portion thereof using the pressure responsive signals.

8. The method of claim 1 wherein the using the difference comprises determining time samples of the difference that exceed a selected threshold, and setting time corresponding samples of the pressure responsive signals equal to zero.

9. A method for seismic surveying, comprising:
towing a seismic energy source and a plurality of pressure responsive seismic sensors and motion responsive seismic sensors in a body of water;
actuating the seismic energy source at selected times;
recording signals detected by the pressure responsive sensors and the motion responsive sensors;
cross ghosting the pressure responsive signals and the motion responsive signals;
determining a difference between the cross ghosted signals; and
using the difference to attenuate noise propagating substantially horizontally in the body of water in at least one of the pressure responsive signals and the motion responsive signals.

10. The method of claim 9 wherein the cross ghosting comprises transforming the pressure responsive signals and the motion responsive signals into the frequency-wavenumber domain and applying a ghosting operator from the pressure responsive signals to the motion responsive signals and vice versa.

11. The method of claim 10 wherein the respective ghosting operators are related to a travel time of seismic energy between a depth of seismic sensors in a body of water and the surface of the body of water.

12. The method of claim 9 wherein the noise comprises at least one of noise from a vessel and noise from a seismic energy source.

13. The method of claim 12 wherein the seismic energy source noise originates from the same source used to acquire the pressure responsive and motion responsive seismic signals.

14. The method of claim 9 wherein the motion responsive signals are normalized for an angle of incidence of seismic energy.

15. The method of claim 9 wherein noise induced in the motion responsive signals by towing seismic equipment in a body of water is attenuated by synthesizing a selected frequency range portion thereof using the pressure responsive signals.

16. The method of claim 9 wherein the using the difference comprises determining time samples of the difference that exceed a selected threshold, and setting time corresponding samples of the pressure responsive signals equal to zero.

* * * * *